Jan. 4, 1949.  L. J. FULLER  2,458,068
SYSTEM FOR THE TREATMENT OF MATERIAL
Filed Nov. 25, 1943  2 Sheets-Sheet 1
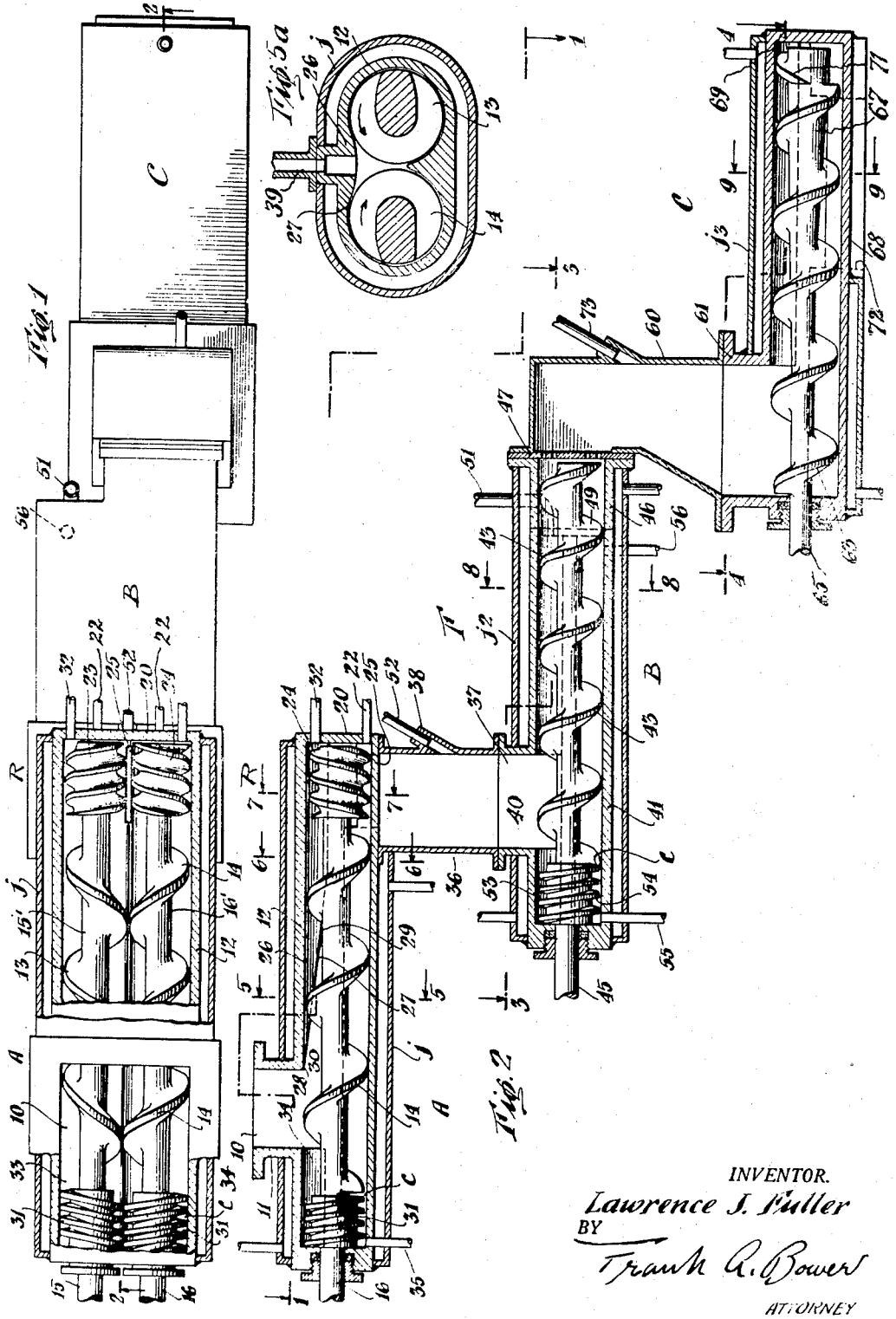
INVENTOR.
Lawrence J. Fuller
BY
Frank A. Bower
ATTORNEY

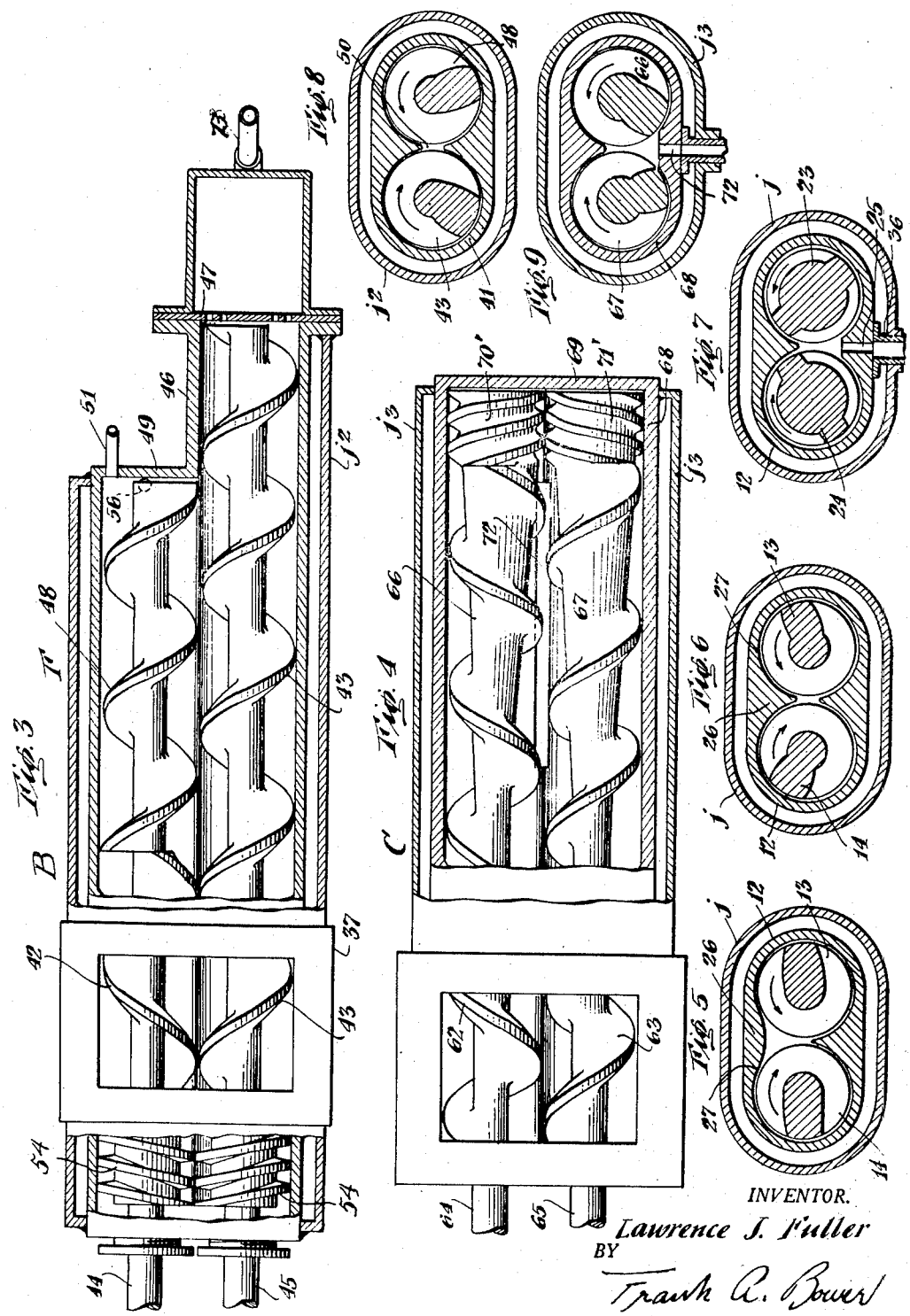

Patented Jan. 4, 1949

2,458,068

UNITED STATES PATENT OFFICE 2,458,068

SYSTEM FOR THE TREATMENT OF MATERIAL

Lawrence J. Fuller, Philadelphia, Pa., assignor to Welding Engineers Incorporated, Norristown, Pa., a corporation of Delaware Application November 25, 1943, Serial No. 511,723

16 Claims. (Cl. 100—48)

This invention relates to the separation of the three forms of matter, namely, gas, liquids and solids when mechanically combined. The solids may exist in a plastic mixture. Also viscous liquids, such as plastics, may be separated from less viscous liquids and gases, and the solids or plastics after separation may be formed into some desirable shape convenient for further processing, handling, packing and shipping.

The object of the invention is to provide a system for the progressive treatment of the material putting the inherent gases into form for removal from the plastic and then separating out the fluids while compacting the remaining material and maintaining it plastic and then finally extruding the consolidated plastic in desired form, such as a flat continuous sheet.

The separation may be accomplished by two simultaneous actions on the material, application of pressure and transfer of heat. When only liquids are to be separated from solids, pressure alone may sometimes be used.

The apparatus to carry out this separation and forming is essentially a modification of the worm type extruding machine with provisions made for the escape of liquids and gases from the extruding barrel while the solids and plastics are carried forward by the flight of the rotating worm or worms and discharged under pressure through a suitable outlet.

Further objects of the invention, such as the provision of special apparatus for the progressive feeding, extracting and extruding of the materials will appear from the following specification taken in connection with the accompanying drawings in which Fig. 1 is a diagrammatic plan view of apparatus employing the system of this invention with the first stage shown broken away in horizontal section taken on line 1—1 of Fig. 2;

Fig. 2 is a vertical sectional view taken on the line 2—2 of Fig. 1;

Fig. 3 is a plan view of the second stage of the system with parts broken away on line 3—3 of Fig. 2 to show the interior construction;

Fig. 4 is a similar view of the third stage illustrating a modification and with parts broken away on line 4—4 of Fig. 2;

Figs. 5, 6 and 7 are cross sectional views of the first stage apparatus taken on the lines 5—5, 6—6 and 7—7 respectively, of Fig. 2;

Fig. 5a is a partial sectional view similar to Fig. 5 and illustrating a further modification;

Fig. 8 is a sectional view of the second stage of the apparatus taken on line 8—8 of Fig. 2; and Fig. 9 is a cross sectional view of the third stage apparatus taken on the line 9—9 of Fig. 2.

In the system shown in the drawings a plastic material containing inherent removable liquids and gases is fed into the first stage A (Fig. 1) at 10, the casing 11 being in hopper form above the casing 12 within which are mounted two screw or worm feeds 13 and 14 on shafts 15 and 16 protruding through the rear end of casing 12 and driven in any desired manner so as to rotate at substantially the same speed in opposite directions and moving downward together at the center as indicated in Figs. 5, 6 and 7.

The material from the hopper is drawn in by the rotating screws 13, 14, the flights of which are in step as indicated (Fig. 1) or staggered to any desired degree, and the combined action of the double screw rotation feeds the material forward toward the right. As the material is fed forward the pressure on it is increased by the action of the screw feeds and to accentuate this the pitch of the screw flights may become steeper and the diameter of the central shaft portions 15', 16' may be progressively increased if desired.

Toward the discharge end at the right the screw flights are preferably reversed in inclination as indicated at 23, 24 (Fig. 1) so as to provide an area R of reverse feed. In this area considerable back pressure is built up, but as no solids or plastics reach the end of the barrel due to the action of the reverse flight, an area free of solids or plastics is created. This condition permits the rapid separation of fluids from the material. The fluids are drawn off by suitable vents located near the end of the barrel, as shown at 22, 32 in the end 20. Plastics under pressure are delivered from a suitable outlet, 25, preferably located between the worms and in the area where the flight of the worms is reversed, or adjacent to it. At this outlet 25 the high pressure of the forward and reverse actions of the screw flights and the downward rotation of the peripheries of the screws forces the plastic outward from both barrels of the casing 12 in a continuous outflow.

As indicated in Figs. 1 and 2, this worm type extractor of the first stage may be provided with a jacket $j$ carrying a heating or cooling medium depending on type of material being processed, also worms 13, 14, or those of later stages, may be heated or cooled, the purpose of which is to raise or lower the temperature of material being carried through the barrel by the rotation of the worms. This action of the worms constantly exposes new surfaces of material to the heated or cooled surfaces, which results in a predetermined uniform rise or lowering of temperature in the material being fed through the equipment. The mixing action prevents local temperature concentration and produces a temperature gradient throughout the length of the barrel.

Any fluids, resulting from the mechanical action of the worms, such as kneading of plastic, pressure developed on material, or heating, will separate from the solids or plastics due to the differential of pressure existing in different parts of the barrel. A pressure gradient exists as the material progresses along the barrel. Since the fluids seek the lower pressure areas, they will progress backward toward the hopper. To expedite removal of these gases the partition 26 (Figs. 2, 5 and 6) at the top between the screws 13, 14 has its lower edge 27 inclined so as to be at hopper level at the point 28 and at a lower level 29 at an intermediate point of the feed giving a free area 30 for escape of the gases back through the hopper. As shown in Fig. 5a the partition between the feed worms may be provided with a slot or outlet 39 for the escape of gases.

Fluids are also removed at the discharge end of the barrel where the flow of material is reversed. A low pressure area is created at the front or discharge end of the barrel beginning just beyond or to the right of the starting of the reverse flight. Outlets for the fluids are shown at 22, 32. Lower pressure area exists at the right hand portion section R. Therefore, gases later developing in the first stage will tend to collect at the discharge end of the feed and to pass through the reverse feed area R to the fluid outlets 22, 32 at the end of the casing 12, and the outflow of the treated material will be unimpeded and in continuous stream.

Liquids pressed out by the action of the feed screws 13, 14 will tend to flow backward and collect under the hopper and to the left in the extension barrel areas 33, 34 carrying the packing worms 31 each formed with a generous clearance c within said barrels to feed back the solids while permitting the fluids to pass on through to the drain 35. To facilitate the draining back of liquids, the flight of the worms may be interrupted or mutilated. Also in some cases, it is desirable to set the extractor at an angle so that liquids may run back more readily by gravity.

In the second stage B (Figs. 1, 2 and 3) the material from the extrusion opening 25 of the first stage is fed in through the casing 36 to hopper 37 formed as a continuation of the discharge of the first stage and discharging the material into the left or entrance end of the double barrel casing 41 having the feed screws or worms 42, 43 on driven shafts 44, 45, the main screw 43 extending throughout the full length of the casing and into the extension 46 leading to the discharge die or opening 47. The flight of this feed screw 43 may be increased in inclination toward the discharge end to raise the pressure toward the discharge. The auxiliary screw 42 may have its right-hand portion 48 reversed in inclination as shown to provide a reverse feed area F developing a back pressure in the material received from the left end of this auxiliary screw, the casing 41 being shut off short at the right end of this auxiliary screw as indicated at 49 so that all of the auxiliary feed is transferred into the main screw through the narrow opening 50 between the two barrels of the casing 41 (Fig. 8) along the length of the flights 43, 48. This reverse screw 48 may be of double or triple lead to give a thorough action in forcing the material over into the main worm 43 and clear the auxiliary barrel for fluid escape.

The kneading and pressure developed, where the reverse in pitch of flight occurs, causes the release of fluids. From this point to the end 49 of the auxiliary barrel, the barrel is kept free of solids or plastic materials, allowing the free passage of fluids through the narrow slot 50 (Fig. 3) between the adjoining barrels. In case solid or plastic material is pushed into the auxiliary barrel, it is carried back and then transferred near the beginning of the reverse flight to the main barrel. Fluids are extracted continuously during the travel along the main worm, where the pressure is constantly being increased and the temperature being raised, when gases are to be removed. This area, marked F, provides free passage of fluids to outlets 51 and 56. Any gases working back through to the hopper 40 from the barrels escape through the gas outlet 52 of connection 38.

Liquids pressed out of the plastic in the hopper end of the barrels will drain backwards into the portion of the barrels 53 extending back of the hoppers in which operate packing worms 54 with generous liquid clearances c permitting the liquids to pass to the drains 55. In the auxiliary barrel of casing 51 the liquids passing on to the discharge end are drained off through the outlet 56, so that this auxiliary barrel provides an escape for both the liquids and gases from the feeding operation.

This building up of pressure by the action of the screw on the material and the relief of the fluids therefrom effectively rids the mass of surplus liquid and gases and gives a very powerful compacting effect while at the same time permitting treatment of the material during the travel through the barrels so that the material extruded through the end die or opening 47 is substantially freed of these fluids and in form for the final extrusion or forming operation, the material passing down through the discharge 60 to the hopper 61 of the third stage C (Figs. 1, 2 and 4) wherein the twin screws 62, 63 on shafts 64, 65 receive the material from the hopper and feed it toward the right.

The screws 62, 63 advance the material through the barrels with constantly increasing pressure until the outlet 72 is reached; from this point forward, a constant uniform pressure is maintained along the entire length of slot outlet 72. By maintaining a constant pressure in this area, an extrusion at a uniform rate is assured. The uniform pressure at the extrusion outlet is maintained by a gradient restriction of material within the barrels. This may be accomplished in a number of ways; Figs. 2 and 4 show the hubs 66, 67 of the worms expanded. The end 69 of the casing 68 is preferably closed and the extreme ends of screws 62, 63 reversed as at 71 (Fig. 2) or 70', 71' (Fig. 4) to help the uniformity of pressure and keep the material from the bearings. The material is thus thoroughly compacted and kept under uniform pressure for extrusion through the opening 72 in sheet or other desired form.

Gases developing will pass back to the hopper 61 and out through the escape pipe 73.

Heating jackets 72, 73 may be provided for the second and third stages as shown, the degrees of heating depending on the particular materials involved.

By this application of pressure on the solid or plastic material, the gases and liquids are readily freed and ejected from the apparatus separate from the final extrusion of the material being treated. This system is particularly well adapted for fluid removal from materials of a stringy, fibrous or plastic nature that will mat or stick together when kneaded by the action of the worms. This mass of solid or plastic substance will readily give up its liquids and gases when pressure has sufficiently been built up by the worm feeding action and sufficiently clear venting space provided for the escape. The application of heat aids in the separation and tends to soften some materials so as to help in the mechanical release of the entrapped gas. By controlling temperature of material in the apparatus, desired results can be obtained in manipulation and feeding of the material.

In all of the stages there is a compacting action due to the correlation of cooperating screw feeds, and in stages A and B this is combined with a free venting of the fluids from the compressed materials.

This system is widely adaptable to various materials throughout a wide range of fluid content and temperature treatments. Since the stages are continuous in operation, they may be joined together as shown, the relative rates of feed being controlled to maintain a constant flow of the treated material and the final result is the extrusion of the compacted material thoroughly and uniformly mixed and with the fluid content reduced to the desired degree, giving very precise and thorough control of the final composition.

The manipulation of the material during feeding gives a continuous persuasive squeezing out of the fluids and permits them to progress away from the area of separation toward the separate discharges, thus definitely segregating the liquid, gaseous and solid outlets so that there is no tendency for the material to in any way oppose or obstruct the separate progress and discharge of the fluids. The system thus is automatically self-conditioning with no opportunity for any of the substances to become jammed or clogged, while at the same time maintaining a very efficient homogenizing and compacting action on the material.

I claim:

1. A system for the treatment of material containing removal fluid comprising a plurality of feed worms in screw form positioned close together side by side and being of opposite pitch and rotating in opposite directions so that central adjacent peripheral portions move in the same direction, a casing for said feed worms provided with an opening for supply of said material to said worms and with a subsequent discharge area, means at said discharge area developing back pressure against the material and providing an adjacent area of lower pressure, a discharge orifice receiving outflow of said material under said back pressure, and venting means at said area of lower pressure releasing fluid separated from said material.

2. A system for the treatment of material containing removable fluid comprising a plurality of feed worms in screw form positioned close together side by side and being of opposite pitch and rotating in opposite directions so that central adjacent peripheral portions move in the same direction, a casing for said feed worms provided with an opening for supply of said material to said worms and with a subsequent discharge area, reverse screw means developing back pressure against said material being fed by said worms and providing an adjacent area of lower pressure, discharge means at said discharge area, and venting means at said area of low pressure releasing fluid separated from said material.

3. A system for the treatment of material containing removable fluid comprising a plurality of feed worms in screw form positioned close together side by side and being of opposite pitch and rotating in opposite directions so that central adjacent peripheral portions move in the same direction, a casing for said feed worms provided with an opening for supply of said material to said worms and with a subsequent discharge area, reverse screw means rotating with said worm feed and developing back pressure against said material being fed by said worms and providing an adjacent area of lower pressure, discharge means at said discharge area, and venting means at said area of low pressure releasing fluid separated from said material.

4. A system for the treatment of material containing removable fluid comprising a plurality of feed worms in screw form positioned close together side by side and being of opposite pitch and rotating in opposite directions so that central adjacent peripheral portions move in the same direction, a casing for said feed worms provided with an opening for supply of said material to said worms and with a subsequent discharge area, means at said discharge area developing back pressure against the material and a following area of lower pressure, a discharge orifice opening from said casing in advance of said area of lower pressure for outflow of said material under said back pressure, and venting means leading from said casing and adapted to release fluid separated from said material.

5. A system for the treatment of material containing removable fluid comprising a plurality of feed worms in screw form positioned close together side by side and being of opposite pitch and rotating in opposite directions so that central adjacent peripheral portions move in the same direction, a casing for such feed worms provided with an opening for supply of said material to said worms and with a subsequent discharge area, means at said discharge area developing back pressure against the material, a discharge orifice opening laterally from said casing and receiving outflow of said material under said back pressure, and venting means leading from said casing and adapted to release fluid separated from said material and comprising orifice means in said casing adjacent the rotatable parts to be cleared by the relative movement of said parts.

6. A system for the treatment of material comprising a plurality of feed worms in screw form positioned close together side by side and being of opposite pitch and rotating in opposite directions so that central adjacent peripheral portions move in the same direction, a casing for said feed worms provided with an opening for supply of said material to said worms and with a subsequent discharge area, means at said discharge area developing back pressure against the material and providing a following area of lower pressure, and a discharge orifice opening from said casing at said back pressure developing means in advance of said area of lower pressure, for outflow of said material under said back pressure.

7. A system for the treatment of material comprising a plurality of feed worms in screw form positioned close together side by side and being of opposite pitch and rotating in opposite directions so that central adjacent peripheral portions move in the same direction, a casing for said feed worms provided with an opening for supply of said material to said worms and with a subsequent discharge area, means at said discharge area developing back pressure against the material and providing a following area of lower pressure, and a discharge orifice opening laterally from said casing at said back pressure developing means and in advance of said area of lower pressure, for outflow of said material under said back pressure.

8. A system for the treatment of material comprising a plurality of feed worms in screw form positioned close together side by side and being of opposite similar pitch and rotating in opposite directions at the same angular velocity with their screw flight peripheries matched and closely opposed at the center to form a central downward feed drawing in material between them, a casing for said feed worms providing a supply opening for feeding said material to said worms and having a subsequent discharge area, means at said discharge area developing back pressure against the material and providing an adjacent area of lower pressure, and a discharge orifice receiving outflow of said material in advance of said area of lower pressure.

9. A system for the treatment of material comprising a plurality of rotatable feed worms in screw form positioned side by side, a casing for said feed worms provided with an opening for supply of said material to said worms and with a subsequent discharge area, a pair of reverse feed worms coaxial with said first mentioned feed worms and positioned at said discharge area developing back pressure against the material and providing a following area of lower pressure, and a discharge orifice opening from said casing adjacent said reverse feed worms and in advance of said area of lower pressure and permitting outflow of said material under said back pressure.

10. A system for the treatment of material containing removable fluid comprising a plurality of feed worms in screw form positioned close together side by side and being of opposite pitch and rotating in opposite directions so that central adjacent peripheral portions move in the same direction, a casing for said feed worms provided with an opening for supply of said material to said worms and with a subsequent discharge area, reverse screw means comprising a counter-feed worm coaxial with one of said rotatable feed worms and developing back pressure against material being fed by said feed worms to transfer material into the feed of the other rotatable feed worm and providing an adjacent area of lower pressure, discharge means at said discharge area, and venting means at said area of low pressure releasing fluid separated from said material.

11. A system for the treatment of material comprising a rotatable worm feeding means, a casing for said feeding means provided with an opening for supply of said material to said means and with a subsequent discharge area, rotatable counter-feeding means at said discharge area developing back pressure against the material fed by said feeding means and providing a following area of lower pressure, and a discharge orifice opening from said casing at said counter-feed in advance of said area of lower pressure, for outflow of said material under said back pressure.

12. A system for the treatment of material as set forth in claim 7 in which the back pressure developing means comprises a pair of reverse feed worms coaxial with said feeding means.

13. A system for the treatment of material as set forth in claim 7 in which the back pressure developing means comprises a plurality of reverse feed worms, and said discharge orifice is positioned in a plane between said reverse feed worms.

14. A system for separating fluid from plastic material comprising a hopper for feeding the supply of mixed plastic and fluid inward toward a line of subsequent movement of said mixture, a pair of oppositely rotating feed worms drawing said mixture inward centrally between pressure surfaces moving inward and toward each other on each side of said supply and feeding said mixture longitudinally under the pressures of said surfaces moving toward each other to a center and away from each other beyond said center, a counter-feed receiving the material at discharge from said feed worms and exerting a counter pressure longitudinally against said plastic and diverting it from said line of movement to a predetermined lateral discharge, and a casing enclosing said feed worms and counter-feed and formed to provide for escape of fluid from said mixture under the action of said feed worms and counter-feed.

15. A system for separating fluid from plastic material comprising a hopper for feeding the supply of mixed plastic and fluid inward toward a line of subsequent movement of said mixture, a pair of oppositely rotating feed worms drawing said mixture inward centrally between pressure surfaces moving inward and toward each other on each side of said supply and feeding said mixture longitudinally under the pressures of said surfaces moving toward each other to a center and away from each other beyond said center, a counter-feed receiving the material at discharge from said feed worms and exerting a counter pressure longitudinally against said plastic and diverting it from said line of movement to a predetermined lateral discharge and providing an adjacent area of lower pressure, and a casing enclosing said feed worms and counter-feed and formed to provide for escape of fluid from said mixture at said area of lower pressure under the action of said feed worms and counter-feed.

16. A system for the treatment of material containing a removable fluid comprising screw worm means including a plurality of screw threads adapted to receive material at one end and rotating in a direction to develop back pressure against said material in a direction toward said receiving end and compress said material into a compact plastic mass, a casing having impervious, curved surfaces at the peripheries of said threads continuous around the bottom portions of said worm means to retain said material under said back pressure and formed with an upper restricted opening of substantially less cross sectional area than said casing and extending through said casing and providing a discharge orifice directed outward from said surfaces at said screw threads, retaining said back pressure at desired amount within said casing and releasing a continuous flow of material outward under said back pressure, feeding means comprising solid worm threads receiving material and moving it under pressure toward said screw worm means and against said back pressure to maintain a supply of material for continuous delivery under said back pressure outward through said orifice, and an area of lower pressure at the outlet of said discharge orifice for the release of fluid from the discharged material.

LAWRENCE J. FULLER.

REFERENCES CITED

The following references are of record in the file of this patent:

UNITED STATES PATENTS

| Number | Name | Date |
|---|---|---|
| 1,478,842 | Staley | Dec. 25, 1923 |
| 1,614,526 | Lambie et al. | Jan. 18, 1927 |
| 2,048,286 | Pease | July 21, 1936 |
| 2,119,162 | Hartner | May 31, 1938 |
| 2,322,791 | De Back | June 29, 1943 |
| 2,334,015 | Levine et al. | Nov. 9, 1943 |

FOREIGN PATENTS

| Number | Country | Date |
|---|---|---|
| 43,189 | Norway | Oct. 11, 1926 |
| 695,211 | France | Sept. 29, 1930 |